US010919802B2

(12) United States Patent
Haq et al.

(10) Patent No.: US 10,919,802 B2
(45) Date of Patent: *Feb. 16, 2021

(54) FERRITE COMPOSITIONS

(71) Applicant: BAE SYSTEMS plc, London (GB)

(72) Inventors: Sajad Haq, Bristol (GB); Michael Dunleavy, Bristol (GB); Hazel Anne Dyke, Bristol (GB); Amy Elizabeth Dyke, Bristol (GB)

(73) Assignee: BAE SYSTEMS plc, London (GB)

( * ) Notice: Subject to any disclaimer, the term of this patent is extended or adjusted under 35 U.S.C. 154(b) by 379 days.

This patent is subject to a terminal disclaimer.

(21) Appl. No.: 15/852,046

(22) Filed: Dec. 22, 2017

(65) Prior Publication Data

US 2018/0169900 A1  Jun. 21, 2018

Related U.S. Application Data

(62) Division of application No. 14/760,632, filed as application No. PCT/GB2014/050084 on Jan. 13, 2014, now Pat. No. 9,855,681.

(30) Foreign Application Priority Data

Jan. 14, 2013 (GB) .................................. 1300569.9

(51) Int. Cl.
 *B29B 11/16* (2006.01)
 *C03C 25/47* (2018.01)
 (Continued)

(52) U.S. Cl.
 CPC .............. *C03C 25/47* (2018.01); *B29B 11/16* (2013.01); *B29B 15/122* (2013.01); *C03C 25/42* (2013.01);
 (Continued)

(58) Field of Classification Search
 CPC ..... B29C 70/36; B29C 70/443; B29C 70/465; B29C 70/467; B29C 70/48; B29C 70/506; B29C 70/521; B29C 70/523
 See application file for complete search history.

(56) References Cited

U.S. PATENT DOCUMENTS 2,887,454 A   5/1959  Toulmin, Jr.
3,000,772 A * 9/1961  Lunn .................... B29C 70/086
                                                            442/208
(Continued)

FOREIGN PATENT DOCUMENTS

CA        2105044 A1    7/1994
EP        1939149 A2    7/2008
(Continued)

OTHER PUBLICATIONS

International Preliminary Report on Patentability and Written Opinion received for Patent Application No. PCT/GB2014/050086, dated Jul. 23, 2015. 8 pages.
(Continued)

*Primary Examiner* — Atul P. Khare
(74) *Attorney, Agent, or Firm* — Finch & Maloney PLLC

(57) ABSTRACT

Ferrite compositions, particularly ferrite coated substrates and more particularly fibre plys coated with ferrites in fibre reinforced polymer composites (FRPC), and composites with a plurality of functionalised fibre layers, include a magnetic ferrite composition for coating a substrate, said composition comprising a resin, and dispersed therein ferrite particulates, wherein said ferrite particulates have an average longest dimension of less than 500 nm. The composition may be used to provide a ferrite composite structure comprising at least one fibre ply, with at least one layer of a magnetic ferrite composition disposed thereon, wherein said
(Continued)

ply is substantially encapsulated in a binder matrix to form a fibre reinforced polymer composite.

20 Claims, 2 Drawing Sheets

(51) Int. Cl.
*C03C 25/42* (2006.01)
*D06M 11/49* (2006.01)
*C08J 5/10* (2006.01)
*C08K 3/22* (2006.01)
*B29B 15/12* (2006.01)
*C03C 25/46* (2006.01)
*C09D 1/00* (2006.01)
*B29K 309/08* (2006.01)
*B29K 505/08* (2006.01)

(52) U.S. Cl.
CPC .............. *C03C 25/46* (2013.01); *C08J 5/10* (2013.01); *C08K 3/22* (2013.01); *C09D 1/00* (2013.01); *D06M 11/49* (2013.01); *B29K 2309/08* (2013.01); *B29K 2505/08* (2013.01); *B29K 2995/0008* (2013.01); *C08K 2003/2265* (2013.01)

(56) References Cited

U.S. PATENT DOCUMENTS

| | | | | |
|---|---|---|---|---|
| 3,526,708 | A * | 9/1970 | Leatherman | H04N 1/506 |
| | | | | 358/301 |
| 3,859,913 | A * | 1/1975 | Leatherman | B41J 2/43 |
| | | | | 101/494 |
| 4,471,015 | A | 9/1984 | Ebneth et al. | |
| 4,515,850 | A | 5/1985 | Ishino et al. | |
| 4,540,737 | A * | 9/1985 | Wissbrun | B29C 70/523 |
| | | | | 264/171.16 |
| 5,110,681 | A * | 5/1992 | Satake | B29B 15/105 |
| | | | | 428/419 |
| 5,171,419 | A | 12/1992 | Wheeler et al. | |
| 5,853,882 | A | 12/1998 | Cenedella et al. | |
| 6,362,434 | B1 * | 3/2002 | Yoshida | B29C 70/025 |
| | | | | 174/256 |
| 8,969,225 | B2 | 3/2015 | Shah et al. | |
| 9,012,781 | B2 * | 4/2015 | Daniel | H01B 5/105 |
| | | | | 174/128.1 |
| 10,298,079 | B2 * | 5/2019 | Tarrant | B29B 15/122 |

| | | | | |
|---|---|---|---|---|
| 2002/0055313 | A1 | 5/2002 | Velpari et al. | |
| 2002/0119255 | A1 * | 8/2002 | Divigalpitiya | B05B 5/057 |
| | | | | 427/8 |
| 2005/0142349 | A1 | 6/2005 | Irwin et al. | |
| 2005/0207263 | A1 | 9/2005 | Okayama et al. | |
| 2005/0247470 | A1 | 11/2005 | Fleming et al. | |
| 2007/0117911 | A1 | 5/2007 | Irwin et al. | |
| 2007/0194269 | A1 | 8/2007 | Kobayashi et al. | |
| 2009/0120681 | A1 | 5/2009 | Matsuzaki | |
| 2009/0142545 | A1 | 6/2009 | Tse et al. | |
| 2010/0203313 | A1 | 8/2010 | Olsson et al. | |
| 2010/0264266 | A1 | 10/2010 | Tsotsis | |
| 2012/0321836 | A1 * | 12/2012 | Aisenbrey | B29B 11/16 |
| | | | | 428/80 |
| 2015/0258743 | A1 * | 9/2015 | Lanard | B29C 70/48 |
| | | | | 264/257 |
| 2016/0176095 | A1 * | 6/2016 | Aisenbrey | B29C 48/15 |
| | | | | 264/483 |

FOREIGN PATENT DOCUMENTS

| | | | |
|---|---|---|---|
| JP | S60197470 | A | 10/1985 |
| JP | S60215014 | A | 10/1985 |
| JP | S60235843 | A | 11/1985 |
| JP | 02120040 | A * | 5/1990 |
| JP | 11192620 | A * | 7/1999 |
| JP | H11192620 | A | 7/1999 |
| JP | 2008243977 | A | 10/2008 |
| WO | 2008148543 | A1 | 12/2008 |
| WO | 2014108702 | A2 | 7/2014 |
| WO | 2014108704 | A2 | 7/2014 |

OTHER PUBLICATIONS

International Preliminary Report on Patentability and Written Opinion received for Patent Application No. PCT/GB2014/050084, dated Jul. 23, 2015. 11 pages.
International Search Report and Written Opinion received for Patent Application No. PCT/GB2014/050084, dated Sep. 17, 2014. 16 pages.
GB Intellectual Property Office Search Report under section 17(5) received for GB Patent Application No. 1300569.9 dated Jul. 5, 2013. 4 pages.
International Search Report received for Patent Application No. PCT/GB2014/050086, dated Jul. 21, 2014. 3 pages.
GB Intellectual Property Office Search Report under Section 17(5) received for GB Patent Application No. 1300572.3 dated Jul. 16, 2013. 4 pages.
Wikipedia Article on "Nickel", obtained Feb. 2019, 33 pages.

* cited by examiner

FERRITE COMPOSITIONS

This patent application is a divisional application of U.S. patent application Ser. No. 14/760,632, titled "FERRITE COMPOSITIONS" filed on Jul. 13, 2015, which is a 371 of International Application No. PCT/GB2014/050084, titled "FERRITE COMPOSITIONS" filed on Jan. 13, 2014, which claims priority to Great Britain Patent Application No. 1300569.9, titled "FERRITE COMPOSITIONS" filed on Jan. 14, 2013. Each of these applications is herein incorporated by reference in its entirety.

The invention relates to ferrite compositions, particularly ferrite coated substrates and more particularly fibre plys coated with ferrites in fibre reinforced polymer composites (FRPC), and composites with a plurality of functionalized fibre layers.

Fibre reinforced polymer composites (FRPC) are finding increased use in structures or as replacement panels, such as, for example replacement panels on vehicles, vessels or crafts, to provide lighter and stronger materials than conventional metal panels.

Ferrites are ceramic compounds comprising iron oxides which have very advantageous magnetic properties. However, the ceramic ferrites are hard but very brittle and so their use as a component, are limited to units which have adequate physical protection of the ferrite component.

According to a first aspect of the invention there is provided a magnetic ferrite composition, said composition comprising a resin, and dispersed therein ferrite particulates, wherein said ferrite particulates have an average longest dimension of less than 500 nm; preferably the average longest dimension is in the range of from 50 to 150 nm. The ferrite may preferably be applied to a substrate.

The ferrite may be present in the ferrite composition in a loading range of from 20-90% v/v, more preferably in the range of from 50 to 80% v/v. The use of a film, layer or coating of a ferrite composition, when applied to a substrate, allows the ferrite to be structurally supported, by said substrate.

The ferrite composition may preferably contain only ferrite particulates in a resin binder.

The magnetic ferrite composition may be supported on a substrate or may be mixed with other fillers or particulates to form a composite resin.

The resin, may be any resin binder, such as for example acrylate binder such as, for example, methylmethacrylate (MMA), an acrylic binder, an epoxy binder, a urethane & epoxy-modified acrylic binder, a polyurethane binder, an alkyd based binder, preferably an epoxy binder.

The resin may be curable resin such as to form a cured resin composite comprising said ferrite composition in a loading range of from 20-90% v/v, more preferably in the range of from 50 to 80% v/v.

The ferrite may be a soft ferrite, preferably a manganese-zinc ferrite or nickel-zinc ferrite material. The nickel ferrite may be in the form of $NiFe_2O_4$, and may additionally comprise one or more of Mn, Zn, Co, Cu or Mg, such as, for example $Ni_{1-x-y}Co_xCu_yFe_{2-z d}Mn_zO_4$, or $Ni_{1-x}Zn_xFe_{2-y}M n_yO_4$.

The substrate may be any structure, surface or element, such as electronic component, housing or fibre ply that is capable of being coated with a layer of the ferrite composition. To assist deposition of the ferrite composition, the ferrite composition may be further dispersed within a solvent. The deposition may be afforded by commonly used techniques, such as spraying, brushing, dipping, rolling, or a printing technique.

In a highly preferred arrangement the substrate is a fibre ply suitable for forming a fibre reinforced polymer composite. According to a further aspect of the invention there is provided a ferrite composite structure comprising at least one fibre ply, said fibre ply comprising said magnetic ferrite composition defined herein, optionally disposed thereon, wherein said ply is substantially encapsulated in a binder matrix to form a fibre reinforced polymer composite.

The layer of ferrite composition may cover part, substantially all or all of the fibre ply. The layer of ferrite composition may in the form a pattern on the at least one surface of the fibre ply. The pattern may be any shape, repeat unit or image, such as, for example a motif, or a frequency selective surface. The patterns may be selected to provide patch array antenna structures, such patterns may be regularly spaced, periodic or asymmetric to form a pattern capable of interacting with EM radiation.

The use of a partial covering of a ferrite composition allows for the provision of an active material within the composite, whilst allowing the binder matrix to flow through the weave of the fibre in the un-coated (i.e., untreated), areas, to maintain structural rigidity to the final cured composite.

The at least one fibre ply may be selected from any combination of woven or non-woven fabrics, and may be selected from any material, such as for example, carbon, glass, ceramic, boron silicon carbide fibres, textile fibres or polymers, such as, for example aramids, polyolefins, and may be selected depending on the desired mechanical or physical properties of the device.

FRPCs typically comprise a plurality of fibre plys to impart strength to the final composite, preferably a further fibre ply, which has not been treated, may be located adjacent to the ferrite fibre ply. The multiplicity of fibre plys provides the structural rigidity to the final composite, the use of interspersed ferrite fibre plys between untreated fibre plys minimizes the overall mass of the final composite.

The composite may comprise at least one metallic fibre ply, which is formed from a fibre ply with at least one layer of at least one non-ferrite metallic material.

The binder matrix may be selected from any commonly used resin binder, as defined earlier, ceramic binder such as, for example alumina or the magnetic ferrite composition as defined herein.

In one arrangement, the binder matrix may comprise particulate fillers, preferably conductive particulate fillers, more preferably the binder matrix may be selected from the magnetic ferrite composition as defined herein. The particulate fillers are preferably nanosized ferrite material of less than 500 nm; preferably the average longest dimension is in the range of from 50 to 150 nm.

According to a further aspect of the invention there is provided a method of manufacturing a device as defined herein, including the steps of providing at least one fibre ply to be treated, deposing or impregnating said magnetic ferrite composition, according to any one of claims 1 to 6 onto said fibre ply, encapsulating said ply in a binder matrix and causing a cure of said binder matrix.

The pattern of ferrite composition may be applied to a substrate by actively depositing the ferrite composition only on the required areas, such as, for example by use of a mask or an active printing nozzle, such via a printer. The pattern may also be formed by removing the unwanted portions of the disposed ferrite composition, using standard lithography techniques.

The ferrite fibre ply may be subjected to further chemical preparations to afford the desired material.

According to a further aspect of the invention there is provided a ferrite composite structure comprising at least one glass fibre ply, with at least 40% v/v of a magnetic ferrite material powder embedded therein, wherein said ferrite has an average longest dimension of less than 500 nm, wherein said ply is substantially encapsulated in a binder matrix to form a fibre reinforced polymer composite.

According to a further aspect of the inventions there is a method of manufacturing a ferrite composite structure, comprising the steps of causing heating of a glass fibre to its softening point, embedding therein a ferrite powder, causing the fibre to cool, encapsulating said ply in a binder matrix and causing a cure of said binder matrix.

In a highly preferred arrangement there are a plurality of fibre plys, so as to provide significant structural strength to the final composite. Conveniently, the use of a pre-preg (pre-impregnated with binder matrix) fibre ply or pre-preg ferrite fibre ply may be used to facilitate lay-up of the device and subsequent manufacture.

Devices according to the invention may be used in new designs or to replace worn, damaged or outdated parts of any items which can be manufactured of a metallic material. Conveniently, where the device is used to replace a panel on an existing body, vehicle, vessel or craft, the device may preferably be engineered to the same dimensions as the original panel.

The device may be used to replace structural panels on a vehicle vessel or craft, such further potential uses on vehicles may include body panels on hybrid or electric drive vehicles where the devices of the invention can be used to save weight and bulk, compared to conventional devices. Such devices may also find use on free flooding hydrodynamic hulls of, say, submersible remotely operated vehicles. The devices would be especially useful on any vehicle where weight or bulk was at a premium, like an aircraft or a satellite. On a satellite, the saving in space and bulk of devices according to the invention which could be used to transfer heat or cooling to various systems and may extend service life of the satellite substantially.

Of potential great importance would be the use of devices according to the invention in electrical or electronic equipment, in particular portable equipment such as computers, personal digital assistants (PDAs), cameras and telephones. Here mountings for such equipment such as circuit boards, casings and the like could be made according to the invention which would, again, assist in cutting down the weight and bulk of such items enabling them to be lighter, smaller and possibly cheaper, owing to the reduced part count.

The composite structures may find particular use on large structure such as wind turbines. The composite structure may be a structural panel or an applique on vehicle vessel or craft.

Whilst the invention has been described above, it extends to any inventive combination of the features set out above, or in the following description, drawings or claims.

Exemplary embodiments of the device in accordance with the invention will now be described with reference to the accompanying drawings in which.

Figure 1:
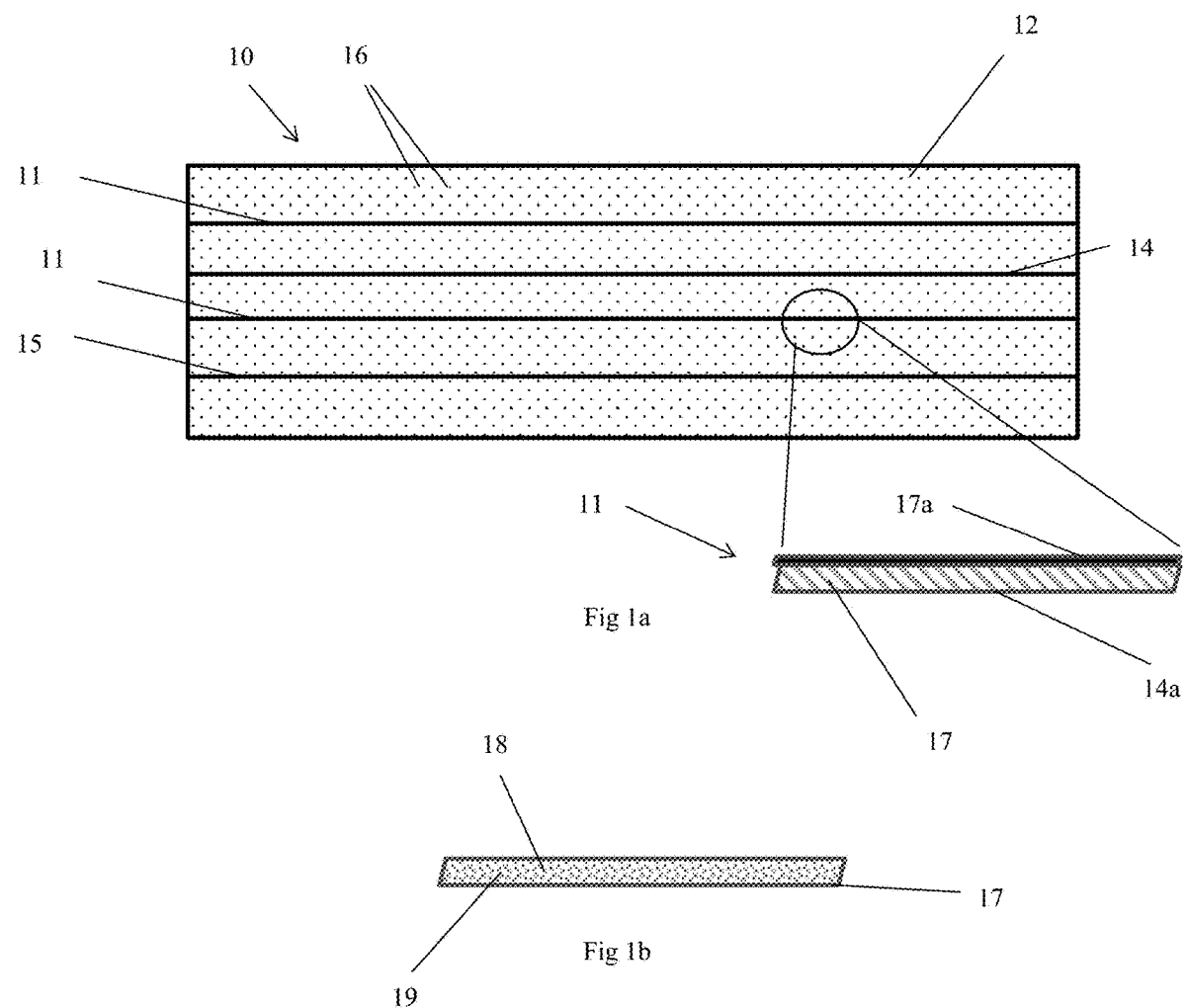
FIGS. 1a and 1b show a composite structure, and ferrite composition

FIG. 1a shows an example of a composite structure depicted generally at 10, comprising a nickel ferrite fibre ply 11, optionally a standard fibre ply 14, optionally a metallic coated fibre ply (non ferrite) 15. The fibre plys (11, 14, 15) are encapsulated in a binder matrix 12 to form the composite structure 10. The binder matrix 12 may also contain filler particulates 16, which may also be nickel ferrite particulates.

The enlarged cut portion shows the nickel ferrite fibre ply 11, which is formed from a standard fibre ply 14a, which is impregnated with a ferrite composition 17 and optionally a surface coating 17a of a ferrite composition. FIG. 1b shows a ferrite composition 17 comprising a resin 18 loaded with ferrite particulates 19.

The resin 18 and binder matrix 12, may be independently selected resins or may be selected from the same resin systems. In a preferred arrangement, the ferrite composition 17 may also be selected as the preferred binder matrix material 12, such that the binder matrix 12 comprises ferrite particulates which are not disposed on the fibre ply.

The layers are not necessarily planar. Non-planar configurations may be employed, for example, to provide a curved or even a generally tubular device structure, or to provide devices which can be shaped to any currently existing shaped panel. The structures of the invention are well suited for such configurations.

Figure 2:
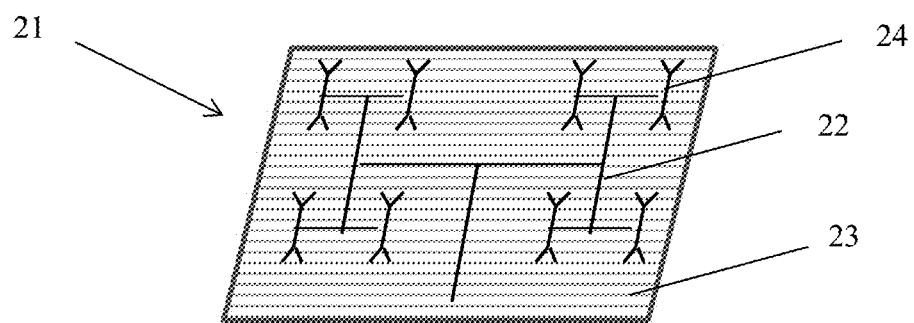
FIG. 2 shows a patch antenna pattern disposed on the surface of a substrate.

FIG. 2 shows a top view of a patch antenna 21, which is formed from a substrate 23, which may be a fibre ply, with a disposed ferrite composition 22 in the form of an array pattern 24.

The invention claimed is:

1. A method of manufacturing a ferrite composite structure comprising at least one glass fibre ply, the method comprising:
   causing heating of the at least one glass fibre ply to a softening point of the at least one glass fiber ply, thereby forming at least one softened glass fiber ply;
   embedding a magnetic ferrite powder in the at least one softened glass fibre ply, wherein particles of the magnetic ferrite powder have an average longest dimension of less than 500 nm;
   causing the at least one softened glass fibre ply to cool, thereby forming at least one cooled glass fibre ply;
   encapsulating the at least one cooled glass fibre ply in a binder matrix, such that the binder matrix directly contacts the at least one cooled glass fibre ply; and
   causing a cure of the binder matrix, thereby forming a fibre-reinforced composite.

2. The method of claim 1, wherein the magnetic ferrite powder is embedded in the at least one softened glass fibre ply by spraying the magnetic ferrite powder.

3. The method of claim 1, further comprising shaping the fibre-reinforced composite to form a structural panel.

4. The method of claim 1, wherein at least 40% v/v of the magnetic ferrite powder is embedded in the at least one softened glass fibre ply.

5. The method of claim 1, wherein the magnetic ferrite powder is dispersed within a solvent.

6. The method of claim 1, wherein the average longest dimension of the particles of the magnetic ferrite powder is in a range from 50 to 150 nm.

7. The method of claim 1, wherein said magnetic ferrite powder is embedded in the at least one softened glass fibre ply in an array pattern.

8. A method of manufacturing a ferrite composite structure comprising at least one glass fibre ply, the method comprising:
   causing heating of the at least one glass fibre ply to a softening point of the at least one glass fiber ply, thereby forming at least one softened glass fiber ply;
   embedding a magnetic ferrite composition in the at least one softened glass fibre ply, the magnetic ferrite composition comprising a resin and a plurality of ferrite particulates, wherein the ferrite particulates of the magnetic ferrite composition have an average longest dimension of less than 500 nm;

causing the at least one softened glass fibre ply to cool, thereby forming at least one cooled glass fibre ply;

encapsulating the at least one cooled glass fibre ply in a binder matrix, such that the binder matrix directly contacts the at least one cooled glass fibre ply; and causing a cure of the binder matrix, thereby forming a fibre-reinforced composite.

9. The method of claim 8, wherein the magnetic ferrite composition is embedded in the at least one softened glass fibre ply by spraying the magnetic ferrite composition.

10. The method of claim 8, further comprising shaping the fibre-reinforced composite to form a structural panel.

11. The method of claim 8, wherein at least 40% v/v of the ferrite particulates are embedded in the at least one softened glass fibre ply.

12. The method of claim 8, wherein the average longest dimension of the ferrite particulates is in a range from 50 to 150 nm.

13. The method of claim 8, wherein said magnetic ferrite composition is embedded in the at least one softened glass fibre ply in an array pattern.

14. A method of manufacturing a ferrite composite structure comprising at least one glass fibre ply, the method comprising:

coating a magnetic ferrite powder over at least a portion of the at least one glass fibre ply, wherein particles of the magnetic ferrite powder have an average longest dimension of less than 500 nm;

causing the at least one glass fibre ply having the magnetic ferrite powder to cool, thereby forming at least one cooled glass fibre ply;

encapsulating the at least one cooled glass fibre ply in a binder matrix, such that the binder matrix directly contacts the at least one cooled glass fibre ply; and causing a cure of the binder matrix, thereby forming a fibre-reinforced composite.

15. The method of claim 14, wherein the magnetic ferrite powder is coated on the at least one glass fibre ply by spraying the magnetic ferrite powder.

16. The method of claim 14, further comprising shaping the fibre-reinforced composite to form a structural panel.

17. The method of claim 14, wherein at least 40% v/v of the magnetic ferrite powder is embedded in the at least one glass fibre ply.

18. The method of claim 14, wherein the magnetic ferrite powder is dispersed within a solvent.

19. The method of claim 14, wherein the average longest dimension of the particles of the magnetic ferrite powder is in a range from 50 to 150 nm.

20. The method of claim 14, wherein said magnetic ferrite powder is coated on the at least one glass fibre ply in an array pattern.

* * * * *